(12) United States Patent
Lee et al.

(10) Patent No.: US 11,557,795 B2
(45) Date of Patent: *Jan. 17, 2023

(54) WASHER FOR SECONDARY BATTERY, SECONDARY BATTERY INCLUDING SAME, AND METHOD FOR MANUFACTURING WASHER FOR SECONDARY BATTERY

(71) Applicant: LG ENERGY SOLUTION, LTD., Seoul (KR)

(72) Inventors: Byoung Gu Lee, Daejeon (KR); Do Gyun Kim, Daejeon (KR); Je Jun Lee, Daejeon (KR); Sang Suk Jung, Daejeon (KR); Hang Soo Shin, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 144 days.

This patent is subject to a terminal disclaimer.

(21) Appl. No.: 16/954,422

(22) PCT Filed: Dec. 21, 2018

(86) PCT No.: PCT/KR2018/016484
§ 371 (c)(1),
(2) Date: Jun. 16, 2020

(87) PCT Pub. No.: WO2019/125057
PCT Pub. Date: Jun. 27, 2019

(65) Prior Publication Data
US 2021/0083333 A1 Mar. 18, 2021

Related U.S. Application Data

(63) Continuation-in-part of application No. 15/554,311, filed on Aug. 29, 2017, now Pat. No. 10,497,992.

(30) Foreign Application Priority Data

Dec. 22, 2017 (KR) .................. 10-2017-0178717

(51) Int. Cl.
*H01M 10/48* (2006.01)
*H01M 10/02* (2006.01)
(Continued)

(52) U.S. Cl.
CPC .......... *H01M 10/4228* (2013.01); *C09J 7/22* (2018.01); *C09J 11/06* (2013.01); *C09J 133/08* (2013.01);
(Continued)

(58) Field of Classification Search
CPC .. H01M 10/4228; H01M 10/48; H01M 10/02; C09J 7/22; C09J 7/30
See application file for complete search history.

(56) References Cited

U.S. PATENT DOCUMENTS 5,132,176 A * 7/1992 Valentine ............ H01M 10/484
429/91
10,160,887 B1 * 12/2018 Ddamulira ................ C09J 5/00
(Continued)

FOREIGN PATENT DOCUMENTS

| CN | 107431253 A | 12/2017 |
| EP | 3258534 A1 | 12/2017 |

(Continued)

OTHER PUBLICATIONS

JP S5569956A. Kawanobe, Kohei. May 27, 1980. English machine translation by EPO. (Year: 1980).*
(Continued)

*Primary Examiner* — James Lee
(74) *Attorney, Agent, or Firm* — Morgan, Lewis & Bockius LLP

(57) ABSTRACT

The present invention relates to a washer for a secondary battery including a film layer and an adhesive layer disposed
(Continued)

on at least one surface of the film layer, wherein the adhesive layer includes an adhesive component and an indicator component, and the indicator component is fat-soluble, a secondary battery including the same, and a method for manufacturing the washer.

8 Claims, 3 Drawing Sheets

(51) Int. Cl.
    *H01M 10/42*     (2006.01)
    *C09J 7/22*     (2018.01)
    *C09J 11/06*     (2006.01)
    *C09J 133/08*     (2006.01)
    *G01N 21/80*     (2006.01)

(52) U.S. Cl.
    CPC ............ *G01N 21/80* (2013.01); *H01M 10/02* (2013.01); *H01M 10/48* (2013.01)

(56) References Cited

U.S. PATENT DOCUMENTS

| | | | | |
|---|---|---|---|---|
| 10,497,992 | B2* | 12/2019 | Lee ..................... | H01M 10/052 |
| 2006/0134511 | A1 | 6/2006 | Ito et al. | |
| 2008/0012430 | A1 | 1/2008 | Peters et al. | |
| 2012/0148888 | A1* | 6/2012 | Yun .................... | H01M 50/543 |
| | | | | 429/82 |
| 2015/0329749 | A1* | 11/2015 | Zhang ..................... | C09J 7/385 |
| | | | | 427/207.1 |
| 2018/0053974 | A1 | 2/2018 | Lee et al. | |

FOREIGN PATENT DOCUMENTS

| | | | | |
|---|---|---|---|---|
| JP | S5569956 | * | 5/1980 | .......... H01M 6/5044 |
| JP | 55-81469 | A | 6/1980 | |
| JP | 58-68880 | A | 4/1983 | |
| JP | 2006-179322 | A | 7/2006 | |
| KR | 10-2006-0059714 | A | 6/2006 | |
| KR | 10-0614399 | B1 | 8/2006 | |
| KR | 10-2015-0056944 | A | 5/2015 | |
| KR | 10-1519742 | B1 | 5/2015 | |
| KR | 10-2016-0123259 | A | 10/2016 | |
| KR | 10-1670921 | B1 | 10/2016 | |
| WO | 2012/160857 | A1 | 11/2012 | |
| WO | 2016/167602 | A1 | 10/2016 | |
| WO | 2017/209366 | A1 | 12/2017 | |

OTHER PUBLICATIONS

Office Action dated May 25, 2021, issued in corresponding Japanese Patent Application 2020-527911. Note: KR 10-2015-0056944 cited therein is already of record.
Extended European Search Report dated Dec. 7, 2020, issued in corresponding European Patent Application 18891204.2.
International Search Report issued in corresponding International Patent Application No. PCT/KR2018/016484, dated Apr. 4, 2019.
Office Action dated Jan. 21, 2022, issued in corresponding Chinese Patent Application 201880076612.5. Note: WO/2017209366, JP S5581469, JP S5868880, and KR 20060059714 cited therein are already of record.
Office Action dated Jul. 20, 2022, issued in corresponding Chinese Patent Application 201880076612.5.
Chemical Analysis, Beijing: Chemical Industry Press, Apr. 30, 1997, pp. 298-306. Note: partial translation included.

* cited by examiner (a)

(b)

WASHER FOR SECONDARY BATTERY, SECONDARY BATTERY INCLUDING SAME, AND METHOD FOR MANUFACTURING WASHER FOR SECONDARY BATTERY

CROSS-REFERENCE TO RELATED APPLICATIONS

This application claims the benefit of Korean Patent Application No. 10-2017-0178717, filed on Dec. 22, 2017, in the Korean Intellectual Property Office, the disclosure of which is incorporated herein in its entirety by reference.

TECHNICAL FIELD

The present invention relates to a washer for a secondary battery, a secondary battery including the same, and a method for manufacturing the washer for secondary battery. Specifically, the washer includes a film layer and an adhesive layer disposed on at least one surface of the film layer, wherein the adhesive layer includes an adhesive component and an indicator component, and the indicator component is fat-soluble.

BACKGROUND ART

Typically, a secondary battery is formed by embedding an electrode assembly composed of a positive electrode, a negative electrode, and a separator interposed between the positive electrode and the negative electrode in a battery case of a metal can or a laminate sheet in a state in which the electrode assembly is laminated or wound, and then injecting or impregnating an electrolyte. Lithium secondary batteries recently developed are widely used in electronic devices such as cellular phones, notebook computer, and electric cars.

Such secondary batteries are divided into liquid electrolyte batteries and polymer electrolyte batteries according to the kind of electrolyte, and a battery using a liquid electrolyte is typically called a lithium ion battery, and a battery using a polymer electrolyte is called a lithium polymer battery. Also, secondary batteries are manufactured in various shapes, and representative shapes thereof may include a cylindrical shape, a square shape, a pouch shape, and the like.

In general, a secondary battery includes a can which is a battery case, an electrode assembly accommodated inside the can, a cap assembly coupled to an opened top of the can, a lead for electrically connecting either a negative electrode terminal or a positive terminal to a protection circuit, and a washer to be coupled to an upper portion of a crimping portion of the can. However, since the washer is located on the upper portion of the crimping portion of the can, an electrolyte injection inlet is covered by the washer. Therefore, in order to check whether the electrolyte is leaked or not, the washer must be removed, which is inconvenient. Also, when gas generated by a trace amount of an electrolyte and/or an electrolyte side reaction is leaked, the leakage is not easily identified from the outside of the battery, with the naked eye, so that there is a problem in that the leakage of the electrolyte was left unattended.

DISCLOSURE OF THE INVENTION

Technical Problem

To solve the problem, it may be considered to include an indicator component in the washer, the color of which changes in a specific acidic region formed by gas generated by an electrolyte and/or an electrolyte side reaction. Specifically, the indicator component may be included in an adhesive layer including an adhesive component for coupling with a crimping portion of a can of the washer. However, when a water-soluble indicator is used, the adhesive component should be synthesized using an aqueous solvent such as water, and to this end, emulsion polymerization should be used. When performing emulsion polymerization, an emulsifier should be used to disperse a monomer for forming an adhesive component such as an acryl-based monomer in water. In this case, the monomer for forming an adhesive component is surrounded by the emulsifier to form a micelle structure, and the cohesion force among the produced adhesive components is reduced due to the weak adhesion force among the micelles. Accordingly, a pushing and a transition phenomenon of the adhesive component may occur causing the contamination of a manufacturing facility which may lead to a problem of malfunction, and the contamination of the exterior of a battery due to the adhesive component.

Therefore, an aspect of the present invention provides a washer for a secondary battery, the washer capable of improving the cohesion force among the adhesive components to prevent the contamination and malfunction of a manufacturing facility and the contamination of the exterior of a battery, a secondary battery using the same, and a method for manufacturing the washer.

Technical Solution

According to an aspect of the present invention, there is provided a washer for a secondary battery including a film layer and an adhesive layer on at least one surface of the film layer, wherein the adhesive layer includes an adhesive component and an indicator component, and the indicator component is fat-soluble.

According to another aspect of the present invention, there is provided a method for manufacturing a washer for a secondary battery, the method comprising preparing an adhesive solution including an adhesive component and a first organic solvent, preparing an indicator solution including an indicator component and a second organic solvent, preparing a composition for an adhesive layer by mixing the adhesive solution and the indicator solution, applying the composition for an adhesive layer on a base film, and drying the base film having the adhesive later applied thereon, wherein the indicator component is fat-soluble.

According to another aspect of the present invention, there is provided a secondary battery including an electrode assembly including a positive electrode, a separator, and a negative electrode, a can having the electrode assembly embedded therein and including a crimping portion on the top thereof, and the washer mounted on the crimping portion.

Advantageous Effects

A washer for a secondary battery according to an embodiment of the present invention includes an adhesive component, and the cohesion force among the adhesive components is large. Accordingly, the contamination and malfunction of a manufacturing facility may be prevented and the contamination of the exterior of a battery may be prevented. Furthermore, since the washer for a secondary battery of the present invention includes an indicator component, the leakage of gas generated by an electrolyte and/or an electrolyte side reaction may be easily identified with the naked eye.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to facilitate understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A washer for a secondary battery according to an embodiment of the present invention includes a film layer and an adhesive layer on at least one surface of the film layer, wherein the adhesive layer includes an adhesive component and an indicator component, and the indicator component is fat-soluble.

Typically, a washer mounted on a cap assembly of a secondary battery basically serves to complement an electrical insulation state, and may serve to protect a battery cell from external impact, and complement the mechanical strength of members mounted on the top of the battery cell. Furthermore, since the washer for a secondary battery of the present invention includes an indicator component, in addition to the basic role mentioned above, the washer of the present invention may serve to identify the leakage of gas generated by an electrolyte and/or an electrolyte side reaction with the naked eye.

Figure 1:
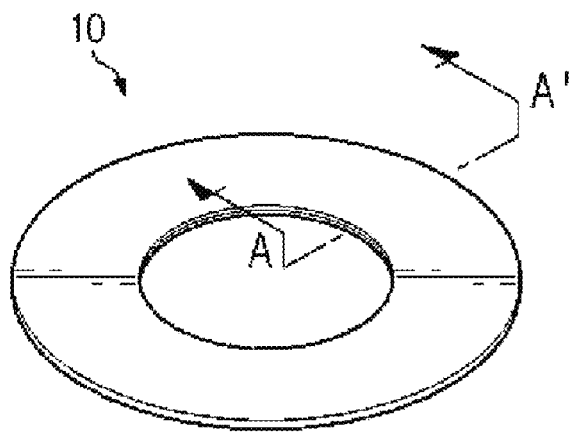
FIG. 1 is a view schematically showing the configuration of a washer according to an embodiment of the present invention.
Figure 2:
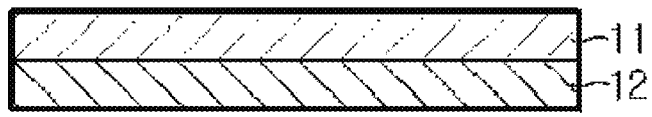
FIG. 2 is a cross-sectional view of the portion A-A' of FIG. 1.

FIG. 1 and FIG. 2 are views respectively showing an example of a washer for a secondary battery according to an embodiment of the present invention.

The washer 10 may include a film layer 11. The film layer is preferably a material layer configured to transmit a change in color of the adhesive layer from the outside with the film layer interposed therebetween. Specifically, the film layer may be a transparent material layer or a translucent material layer.

The film layer includes a polymer resin, and the polymer resin may include at least any one selected from the group consisting of a polyolefin-based polymer resin, an acryl-based polymer resin, a polycarbonate-based polymer resin, a vinyl-based polymer resin, an acrylonitrile-butadiene-styrene (ABS) resin, a polystyrene-based polymer resin, a polycarbonate-based polymer resin, tetrafluoroethylene, teflon, polybutylterephthalate, and polyethylene terephthalate. Specifically, the polymer resin of the film layer of the invention may be at least any one selected from the group consisting of polypropylene, a polycarbonate-based polymeric resin, and polyethylene terephthalate. Examples of the polyolefin-based polymer resin include, but are not limited to, low density polyethylene (LDPE), linear low density polyethylene (LLDPE), high density polyethylene (HDPE), ultra high molecular weight polyethylene (UHMWPE), polypropylene, polybutene, polymethylpentene and copolymers thereof.

A method for manufacturing the film layer is not particularly limited. For example, the film layer may be produced by sufficiently mixing a polymer resin selected from the above, an additive, and the like by any suitable mixing method to prepare a resin composition, and then film molding the resin composition.

In the present invention, examples of the film molding method may include any suitable film molding method such as a solution casting method (solution flexibility method), a melt extrusion method, a calendar method, and a compression molding method. Among these film molding methods, a solution casting method (solution flexibility method) and a melt extrusion method are preferable.

The film layer may include an unstretched film and/or a stretched film. When the film layer is a stretched film, the film layer may be a uniaxially stretched film or a biaxially stretched film, and when the film layer is a biaxially stretched film, the film layer may be any one of a simultaneous biaxially stretched film or a continuous biaxially stretched film. When biaxially stretched, the mechanical strength is improved, and thus the film performance is improved. Also, in order to stabilize the optical isotropic or mechanical properties, the film layer may be subjected to a heat treatment (annealing) and the like after the stretching treatment. Heat treatment conditions are not particularly limited, and may employ any suitable conditions known in the art.

Referring to FIG. 2, the adhesive layer 12 may be on at least one surface of the film layer 11. The adhesive layer serves to ensure that the position of the washer is adhered to a top cap or a crimping portion of the cap to be described later, and also to help the sealing of a region between a cap assembly and a battery can.

The adhesive layer may include an adhesive component and an indicator component.

The adhesive layer may include a pressure-sensitive adhesive component. The adhesive component may include at least any one selected from the group consisting of an acryl-based adhesive compound, a rubber-based adhesive compound, a silicone-based adhesive compound, and a vinyl ether-based adhesive compound, but is not limited thereto. Since the pressure-sensitive adhesive component of the adhesive component may be used, the washer may be adhered to a top cap or a cap plate only by a simple process of applying a predetermined pressure. Therefore, it is advantageous in terms of process efficiency.

The acryl-based adhesive compound may include at least any one of a) a (meth) acrylate-based resin such as a polymer comprising an acrylate-derived unit, b) a homopolymer or a copolymer comprising an acrylic acid ester-based monomer derived unit such as butyl acrylate, methyl methacrylate, ethyl acrylate, vinyl acrylate, acrylonitrile, acrylamide, styrene, methyl acrylate, methacrylic acid, acrylic acid, itaconic acid, hydroxyethyl acrylate, hydroxypropyl acrylate, isononyl acrylate, 2-ethylhexyl acrylate; and c) a copolymer comprising at least one selected from the acrylic acid ester-based monomer derived unit, an acrylic acid monomer derived unit, an acrylic acid 2-hydroxy ethyl monomer derived unit, and a vinyl acetate monomer derived repeating unit.

The (meth) acrylate-based resin includes a resin including a (meth) acrylate-based monomer derived unit as a main component, and includes not only a homopolymer resin composed of a (meth) acrylate-based monomer derived unit, but also a copolymer resin copolymerized with other monomer derived units other than a (meth) the acrylate-based monomer derived unit and a blended resin in which the (meth) acrylate-based resin is blended with another resin.

The (meth) acrylate-based monomer derived unit may be, for example, an alkyl (meth) acrylate-based monomer-derived unit. Here, the alkyl (meth) acrylate-based monomer unit means both an alkyl acrylate-based monomer derived unit and an alkyl methacrylate-based monomer derived unit, and the alkyl group in the alkyl (meth) acrylate-based monomer derived unit preferably is 1 to 10 carbon atoms, more preferably 1 to 4 carbon atoms.

Examples of the rubber-based adhesive compound include, but are not limited to, synthetic polyisoprene rubber, styrene-isoprene-styrene block copolymer, natural rubber, polyisobutene, polybutene, and the like.

The indicator component serves to identify the leakage of gas generated by an electrolyte and/or an electrolyte side reaction with the naked eye.

When manufacturing a washer for a secondary battery, an adhesive component is used in an adhesive solution state with the solvent used in the polymerization of the adhesive component. An indicator solution including an indicator component and a separate solvent may be introduced to the solution and mixed to form a composition for an adhesive layer. At this time, since the solvent used in the polymerization of the adhesive component is used as it is, for the dissolution of the indicator component, the water-solubility/fat-solubility of the solvent should be consistent with the water-solubility/fat-solubility of the indicator component. For this reason, when a water-soluble indicator is used unlike in the present invention, the adhesive component should be synthesized using an aqueous solvent such as water. To this end, emulsion polymerization should be used. When performing emulsion polymerization, an emulsifier should be used to disperse a monomer for forming an adhesive component such as an acryl-based monomer in an aqueous solvent. In this case, the monomer for forming an adhesive component is surrounded by the emulsifier to form a micelle structure, and the cohesion force among the produced adhesive components is reduced due to the weak adhesion force among the micelles. Accordingly, a pushing and a transition phenomenon of the adhesive component may occur causing the contamination of a manufacturing facility which may lead to a problem of malfunction, and the contamination of the exterior of a battery due to the adhesive component. Furthermore, when the water-soluble indicator is dissolved in the aqueous solvent, aggregation occurs among the water-soluble indicators, and thus the appearance defect of the washer of the secondary battery occurs.

When considering the above, it is an important technical feature that the indicator component is fat-soluble in the present invention. Since an indicator component used in the present invention is fat-soluble, when forming a composition for an adhesive layer, an organic solvent should be used. Also, since the solvent used in the polymerization of the adhesive component, that is, a solvent constituting an adhesive solution including the adhesive component should be mixed with an organic solvent used in forming a composition for an adhesive layer, an organic solvent may be used as a solvent of an adhesive solution. In this case, since the adhesive component may be synthesized by solution polymerization not by emulsion polymerization, a micelle structure is not formed, so that the cohesion force among the adhesive components may be improved. Also, monomers for forming an adhesive component may be polymerized to form a long polymer chain, and in some cases, the polymer chains may be cross-linked. Accordingly, the cohesion force among adhesives may be further improved. Accordingly, a pushing and a transition phenomenon of an adhesive component may be reduced, so that the contamination and malfunction of a manufacturing facility may be prevented and the contamination of the exterior of a battery may be prevented.

The indicator component may include at least any one of p-dimethylaminoazobenzene, tropeolin OO, crystal violet, celliton fast violet 6B, and pentamethoxy red.

Also, for example, the color of the fat-soluble indicator component may change in an acidic region of pH 4.0 or less. In general, gas generated by an electrolyte and/or an electrolyte side reaction exhibits an acidity of pH 4.0 or less. Therefore, when the indicator component the color of which is configured to change in an acidic region of pH 4.0 or less is used, the leakage of the gas generated by an electrolyte and/or an electrolyte side reaction may be identified with the naked eye through color changes. Specifically, the acidic region may be pH 0.5 to pH 4.0, more specifically pH 0.5 to pH 3.0.

The indicator component may be included in an amount of 0.02 wt % to 30 wt % based on the total weight of the adhesive layer, specifically 0.02 wt % to 10 wt %, more specifically 0.02 wt % to 3 wt %. When the above ranges are satisfied, the content of the adhesive component is relatively sufficiently secured, so that the adhesion force between the washer and the crimping portion of the can may be secured, and the color change may be more accurately detected with the naked eye. Also, in the present invention, an indicator component is dissolved using an organic solvent, even when the content of the indicator component is low, whether electrolyte-related leakage has occurred or not may be identified. Furthermore, the content of the adhesive component is relatively increased, so that the adhesion force may be further improved.

The washer for a secondary battery may further include a hygroscopic material capable of absorbing leaked electrolyte. The hygroscopic material may include at least any one selected from the group consisting of rayon, horn-spun, polyviscose and polynosic, and may be specifically polynosic.

The thickness of the washer for a secondary battery may vary depending on the material thereof, and therefore is not particularly limited. However, the thickness of the washer may be preferably 0.05 mm to 2 mm, 0.05 mm to 1.5 mm, 0.05 mm to 1 mm, or 0.05 mm to 0.8 mm. The thickness of a washer for a secondary battery affects the mechanical stiffness, elasticity, and the like thereof. If a washer for a secondary battery is too thin, a desired mechanical stiffness may not be exhibited and the washer may be destroyed even by weak external impact. On the contrary, if a washer for a secondary battery is too thick, the size of a battery is significantly increased, and therefore, is not desirable. Therefore, in consideration of the above points in combination, the thickness of a washer may be appropriately determined within the above range.

A method for manufacturing a washer for a secondary battery according to another aspect of the present invention includes preparing an adhesive solution including an adhesive component and a first organic solvent, preparing an indicator solution including an indicator component and a second organic solvent, preparing a composition for an adhesive layer by mixing the adhesive solution and the indicator solution, applying the composition for an adhesive layer on a base film, and drying the base film having the adhesive later applied thereon, wherein the indicator component is fat-soluble. Specifically, the indicator component is the same as the indicator component of the embodiment described above.

The method for manufacturing a washer for a secondary battery is characterized in that an organic solvent which is not an aqueous solvent is used for the polymerization of an adhesive component.

In the step of preparing the adhesive solution, the first organic solvent may be at least any one selected from an aliphatic hydrocarbon-based solvent such as cyclohexane and n-heptane; an aromatic hydrocarbon-based solvent such as toluene, xylene, Solvesso 100 and Solvesso 150; an alcohol-based solvent such as methanol, ethanol, isopropyl alcohol (IPA) and n-butanol (n-BuOH); an ester-based solvent such as ethyl acetate and n-butyl acetate; a ketone-based solvent such as acetone, methyl ethyl ketone, methyl i-butyl ketone and cyclohexanone; and a glycol-based solvent such as ethyl cellosolve, dowanol PM, butyl cellosolve, dowanol PMA, and butyl carbitol.

The adhesive component is the same as the adhesive component of the embodiment described above. For example, the adhesive component may be formed by the polymerization of a monomer for forming an adhesive component. The monomer for forming an adhesive component may be at least any one selected from the group consisting of a (meth) acrylate-based monomer, an acrylic acid-based monomer, and an acrylic acid monomer, acrylic acid 2-hydroxy ethyl monomer, and vinyl acetate monomer. Although not limited thereto, the monomer for forming the adhesive component may be polymerized by a polymerization method using an initiator. The initiator may be at least any one selected from the group consisting of azo bis iso-butyrate nitrile, benzoyl peroxide, di tert-butyl peroxide, tert-butyl perbenzoate, and kali persulfate.

The monomer for forming an adhesive component may be polymerized by solution polymerization. Specifically, since an organic solvent which is not an aqueous solvent is used in the polymerization process, the polymerization may be solution polymerization. Accordingly, a micelle structure which is generated during emulsion polymerization is not formed during solution polymerization, so that the cohesion force among the adhesive components may be improved. Also, monomers for forming an adhesive component may be polymerized to form a long polymer chain, and in some cases, the polymer chains may be cross-linked. Accordingly, the cohesion force among adhesives may be further improved. Accordingly, a pushing and a transition phenomenon of an adhesive component may be reduced, so that the contamination and malfunction of a manufacturing facility may be prevented and the contamination of the exterior of a battery may be prevented.

In the preparing of an indicator solution including an indicator component and a second organic solvent, the indicator component is the same as the indicator component described in the above embodiment, and therefore, the description thereof will be omitted.

The second organic solvent may be at least any one selected from an aliphatic hydrocarbon-based solvent such as cyclohexane and n-heptane; an aromatic hydrocarbon-based solvent such as toluene, xylene, Solvesso 100 and Solvesso 150; an alcohol-based solvent such as methanol, ethanol, isopropyl alcohol (IPA) and n-butanol (n-BuOH); an ester-based solvent such as ethyl acetate and n-butyl acetate; a ketone-based solvent such as acetone, methyl ethyl ketone, methyl i-butyl ketone and cyclohexanone; and a glycol-based solvent such as ethyl cellosolve, dowanol PM, butyl cellosolve, dowanol PMA, and butyl carbitol. Specifically, the second organic solvent may be the same as the first organic solvent.

In the step of preparing a composition for an adhesive layer by mixing the adhesive solution and the indicator solution, the first organic solvent and the second organic solvent are both organic solvents. Thus, when the adhesive solution and the indicator solution are mixed, the layer separation thereof does not occur and the mixing may be smoothly performed. Furthermore, a fat-soluble indicator component may be easily dissolved in the first organic solvent and the second organic solvent.

In the step of applying the composition for an adhesive layer on a base film and drying, the base film may be a structure for forming a film layer of the embodiment described above. Specifically, the film layer of the embodiment described above may be formed by cutting the base film. Accordingly, the base film may have the same constituent materials as the film layer described above.

The applying may be performed by a roll coater; a comma coater; a die coater such as a curtain coater, a slide coater, and a slot die coater; micro gravure and the like.

The drying may be performed by drying the base film applied with the composition for an adhesive layer at a temperature of 70° C. to 200° C. for about 0.02 hours to 2 hours. Accordingly, an organic solvent of the composition for an adhesive layer may be removed.

After the drying, the base film and the dried composition for an adhesive layer were cut to form the washer for a secondary battery of the present invention including the film layer and the adhesive layer described above. That is, the base film may be cut to be a film layer, and the dried composition for an adhesive layer may be cut to be an adhesive layer.

A secondary battery according to another aspect of the present invention includes an electrode assembly including a positive electrode, a separator, and a negative electrode, a can having the electrode assembly embedded therein and including a crimping portion on the top thereof, and a washer mounted on the crimping portion, and the washer is the same as the washer for a secondary battery of the embodiment described above.

Figure 3:
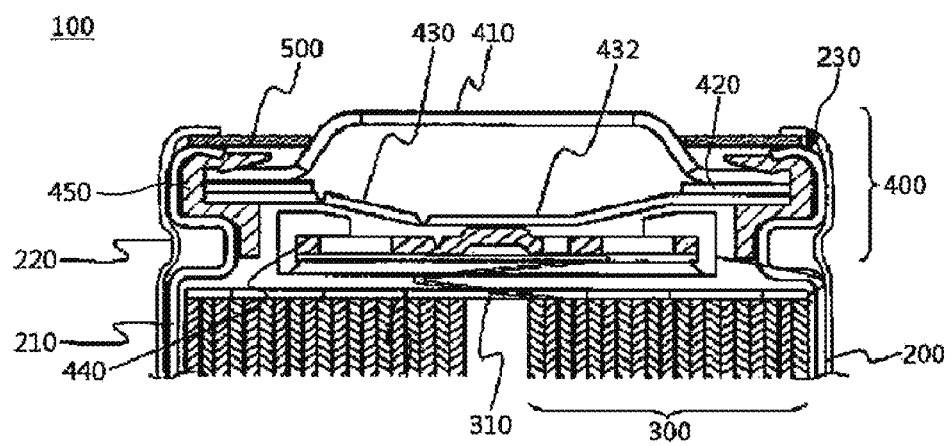
FIG. 3 is a view schematically showing a portion of a secondary battery according to another embodiment of the present invention.

FIG. 3 is a schematic view showing a portion of the secondary battery. Referring to FIG. 3, a battery 100 according to another embodiment of the present invention may be manufactured by inserting an electrode assembly 300 as a power generation device into a can 200, injecting an electrolyte thereinto, mounting a cap assembly 400 on an opened top of the can 200, inserting the can 200 into the heat-shrinkable tube 220 in a state in which the cap assembly 400 is mounted, and applying a predetermined heat thereto. Also, the can 200 may include a crimping portion 230 on the top thereof which is formed by bending a portion of an opening of the can 200 inward. In the present invention, the can may be a cylindrical can, or a square can. In an example, when the can is a cylindrical can, the cap assembly has a positive electrode protrusion terminal connected to an electrode assembly formed at the center thereof, and the cylindrical can and a cap plate may have a structure for forming a negative electrode terminal while being insulated from the positive terminal. In another example, when the can is a square can, the cap assembly has a negative electrode protrusion terminal connected to an electrode terminal formed at the center thereof, and the square can and a cap plate may have a structure for forming a positive electrode terminal while being insulated from the negative terminal.

The cap assembly 400 includes an overcurrent prevention PTC device 420 and a safety vent 430 for reducing internal pressure. Specifically, inside a gasket 450 for airtightness to be mounted on an upper beading portion 210 of the can 200, the PTC device 420 for blocking overcurrent to a top cap 410, and the safety vent 430 for reducing internal pressure are installed in close contact with each other. The center of the top cap 410 protrudes upward to serve as a positive terminal by the connection with an external circuit. The bottom of the safety vent 430 is connected to the positive electrode of a power generation device 300 through a current blocking member 440 and a positive electrode lead 310.

The safety vent 430 is a thin conductive plate and a central portion thereof forms an indentation portion 432 directing downward. Two notches having depths different are formed in the upper bent portion and the lower bent portion of the indentation portion 432, respectively.

Although not limited thereto, the washer 500 may be formed in a disc structure so as to be mounted on the crimping portion 230 while wrapping the top cap 410 of the cap assembly 400. When the heat-shrinkable tube 220 is contracted, the mounting of the washer 500 on the crimping portion 230 is achieved by the heat-shrinkable tube wrapping the outer circumferential surface of the washer 500.

The washer 500 prevents internal short circuit induced by the top cap 410 as a positive terminal coming into contact with the can 200 as a negative terminal. Also, the washer 500 is composed of an electrolyte hygroscopic material, and thus serves to absorb an electrolyte when the electrolyte is leaked along the interface between the crimping portion 230 and the beading portion 210 and the gasket 450, as a cylindrical can is damaged by external impact. The washer may be fixed to the top of the cap assembly in an adhesive manner or a mechanical coupling manner.

Figure 4:
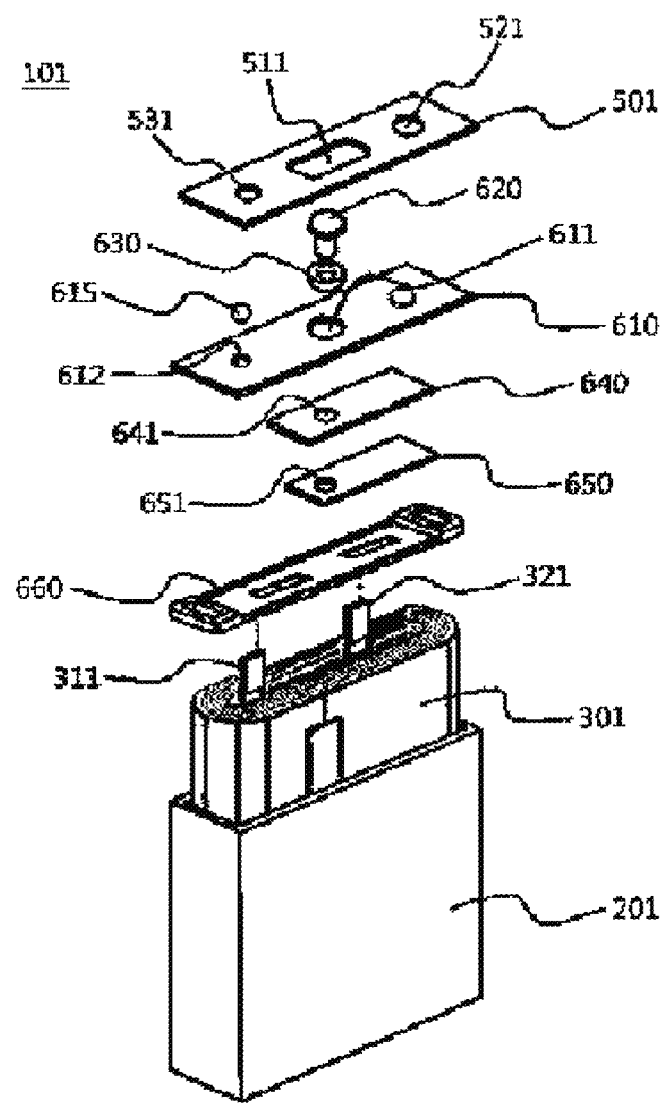
FIG. 4 is a view schematically showing a secondary battery according to another embodiment of the present invention.

FIG. 4 is an exploded perspective view of a secondary battery according to another embodiment of the present invention. The secondary battery of FIG. 4 is a prismatic battery, but the secondary battery of the present invention is not limited to a prismatic battery.

Referring to FIG. 4, a secondary battery 101 may include a can 201, an electrode assembly 301 accommodated inside the can 201, a cap assembly including a cap plate 610 coupled to an opened top of the can 201, and a washer 501 installed on the cap plate 610.

The can 201 is a metal material having a substantially rectangular shape, and may serve as a terminal for itself. The cap assembly may include the cap plate 610, an insulation member 640, a terminal plate 650, and an electrode terminal 620.

The cap plate 610 is made of a metal plate having a size and shape corresponding to the opened top of the can 201, and a first terminal opening 611 through which the electrode terminal 620 is inserted is formed at the center thereof. The electrode terminal 620 is connected to a first electrode tab 311 or a second electrode tab 321 to serve as a negative terminal. When the electrode terminal 620 is inserted into the first terminal opening 611, in order to insulate the electrode terminal 620 and the cap plate 610, a tube-type gasket 630 may be coupled to the outer surface of the electrode terminal 620 and inserted there together with.

On one side of the cap plate 610, a safety belt is formed by forming a groove having a predetermined depth to reduce the thickness of the cap plate 610, or by forming a hole, welding the hole with a thin plate to seal the hole such that when the pressure inside the battery rises or explosion occurs, the cap plate 610 ruptures at a pressure lower than pressure of a dangerous level. Also, on the other side, an electrolyte injection inlet 612 of a predetermined size is formed, and the electrolyte injection inlet 612 becomes a path through which an electrolyte is injected after the cap assembly 600 is assembled to an opening of the can 101, and is sealed with a metal ball 615.

The insulation member 640 is formed of an insulation material as in the case of the gasket 630, and is coupled to the bottom surface of the cap plate 610. The insulation member 640 has a second terminal opening 641 at a position corresponding to that of the first terminal opening 611 of the cap plate 610.

The terminal plate 650 is coupled to the bottom surface of the insulation member 640, and has a third terminal opening 651 into which the electrode terminal 620 is inserted at a position corresponding to that of the first terminal opening 611 of the cap plate 610. Accordingly, the electrode terminal 620 is electrically insulated from the cap plate 610 and is electrically connected to the terminal plate 650 by the gasket 630.

Also, on the top surface of the electrode assembly 301, a top insulator 660 covering the top of the electrode assembly 301 is mounted to electrically insulate the electrode assembly 301 and the cap assembly 600, and the electrode terminal 620 is connected to an electrode lead wire (not shown) to be connected to an external terminal.

Here, when the electrode terminal 620 is connected to the second electrode tab 321, the cap plate 610 is connected to the first electrode tab 311, and thus the electrode terminal 620 should be insulated from the cap plate 610 connected to the electrode terminal 620. Accordingly, on an upper side of the cap plate 610, that is, between the cap plate 610 and the electrode terminal 620, the washer 501 is installed. The washer mounted on the crimping portion 230 may be fixed on a corresponding portion by various methods. For example, a mechanical coupling method in which a heat-shrinkable tube to be mounted on an outer surface of a can is contracted to fix the outer circumferential surface of the washer also, an adhesive method in which an adhesive material is added on the bottom surface of a washer or the top surface of the crimping portion 230 to adhere each other, and the like may be used.

The washer 501 is composed of a hygroscopic material having electrical insulation and capable of absorbing an electrolyte, and has an electrode terminal hole 511 in a central portion thereof such that the electrode terminal 620 connected to an electrode lead wire (not shown) is exposed. A safety vent hole 521 is formed at one side of the washer 501 as an exposing portion for exposing a safety vent, and an injection hole 531 is formed at the other side such that the electrolyte injection inlet 612 is exposed.

Therefore, even if an electrolyte is leaked to the outside of the can 201 due to various causes, leaked electrolyte is immediately absorbed by the washer 501. Therefore, it can be prevented that the leaked electrolyte corrodes, for example, a PCM (not shown) to be mounted on the top of the battery 101, thereby causing an internal short circuit.

In the present invention, the electrode assembly 300 may include a structure in which a positive electrode and a negative electrode are disposed with a separator interposed therebetween. At this time, the electrode assembly 300 may have a structure in which one positive electrode and one negative electrode are wound with a separator interposed therebetween, or a structure in which a plurality of positive electrodes and a plurality of negative electrodes are laminated with a separator interposed therebetween. In addition, the positive electrode and the negative electrode may each be formed as a structure in which an active material slurry is applied on an electrode current collector, and the slurry is typically formed by stirring a granular active material, an auxiliary conductor, a binder and a plasticizer in a state in which a solvent is added thereto.

Meanwhile, in the electrode assembly 300, there may be an uncoated region in which a slurry is not applied on an electrode plate, and an electrode tab corresponding to each electrode plate may be provided in the uncoated region. That is, a positive electrode tab (not shown) may be attached to a positive electrode plate of the electrode assembly 200 and a negative electrode tab may be attached to a negative electrode plate of the electrode assembly 300, and each of the tabs is connected to another component such as an electrode lead.

The secondary battery according to the present embodiment may be preferably a lithium secondary battery. Also, the present invention provides a battery pack or a medium- or large-sized battery module including the secondary battery as a unit cell.

The secondary battery according to the present invention may be preferably used for a high-power, large-capacity battery which requires long lifespan and excellent durability, or for a medium- or large-sized battery module including a plurality of such batteries as a unit cell. The medium- or large-sized battery module may be used as a power source for, for example, electric cars, hybrid electric cars, plug-in hybrid electric cars, electric motorcycles, electric bicycles, and the like.

In addition, the battery pack according to the present invention may further include various protection devices for controlling charging and discharging of the secondary battery such as a battery management system (BMS) in addition to the secondary battery.

Hereinafter, the present invention will be described in further detail with reference to Examples and Comparative Examples. However, the following examples are intended to illustrate the present invention and the scope of the present invention is not limited thereto.

Example 1: Manufacturing of Washer for Secondary Battery (1) Formation of Composition for Adhesive Layer Using methyl ethyl ketone and toluene as an organic solvent, ethyl acrylate, butyl acrylate, and 2-ethylhexyl acrylate, which are monomers for forming an adhesive component, were polymerized to form an adhesive solution including an adhesive component and the organic solvent. Meanwhile, 0.12 g of p-dimethylaminoazobenzene, which is an indicator component, was added to methyl ethyl ketone and toluene, and then mixed therewith to form an indicator solution. Thereafter, the adhesive solution and the indicator solution were mixed to form a composition for an adhesive layer. The indicator component was 0.04 wt % based on the total weight of the solid content of the composition for an adhesive layer.

(2) Manufacturing of Washer for Secondary Battery

The composition for an adhesive layer was applied on a transparent polyethylene terephthalate having a thickness of 0.1 mm and a cloudiness of 56% or less by a comma coater process. Thereafter, the transparent polyethylene terephthalate applied with the composition for an adhesive layer was dried at 120° C. for 10 minutes. The dried composition for an adhesive layer and polyethylene terephthalate were cut to manufacture a washer.

Comparative Example 1: Manufacturing of Washer for Secondary Battery (1) Formation of Composition for Adhesive Layer Using water as an organic solvent, ethyl acrylate, butyl acrylate, and 2-ethylhexyl acrylate, which are monomers for forming an adhesive component, were polymerized to form an adhesive solution including an adhesive component and the water. Meanwhile, 5 g of methyl orange, which is an indicator component, was added to water, and then mixed therewith to form an indicator solution. Thereafter, the adhesive solution and the indicator solution were mixed to form a composition for an adhesive layer. The indicator component was 5 wt % based on the total weight of the solid content of the composition for an adhesive layer.

(2) Manufacturing of Washer for Secondary Battery

The composition for an adhesive layer was applied on a transparent polyethylene terephthalate having a thickness of 0.1 mm and a cloudiness of 56% or less by a comma coater process. Thereafter, the transparent polyethylene terephthalate applied with the composition for an adhesive layer was dried at 120° C. for 10 minutes. The dried composition for an adhesive layer and polyethylene terephthalate were cut to manufacture a washer.

Experimental Example 1: Evaluation of Adhesion Force and Adhesion Force Distribution Using a universal material testing machine (UTM), the adhesion force distribution of a washer was evaluated.

Specifically, the washer of Example 1 and the washer of Comparative Example 1 were placed on an SUS plate to have a width of 25 mm, respectively, and a 2 kg roller was reciprocated two times on the washer on the SUS plate at a speed of 100 mm/min. The SUS plate on which the washer is placed was stored at room temperature for 20 minutes to prepare a specimen. Thereafter, using the UTM, the washer was detached from the SUS plate at an angle of 180 degrees, and the speed at this time was 300 mm/min. The load of a load cell was 250 N. The average adhesion force was obtained by measuring the adhesion force between 30 mm and 90 mm sections and calculating the average thereof. Also, a Process Capability Index (Cpk) was calculated by measuring a value by 32 points for each specimen.

Experimental Example 2: Evaluation of Adhesion Force Retention Time (Evaluation of Cohesion Force Among Adhesives)

The washer of Example 1 and the washer of Comparative Example 1 were placed on an SUS plate to have a width of 25 mm, respectively, and a 2 kg roller was reciprocated two times on the washer on the SUS plate at a speed of 100 mm/min. The SUS plate on which the washer is placed was stored at room temperature for 20 minutes to prepare a specimen.

The following tests were conducted for each specimen. A 1 kg weight was fixed to a washer through a clip, and the weight was installed in a reactor having an internal temperature of 80° C. to face in the direction of gravity. Thereafter, the specimen was observed with the naked eye every 5 minute without opening the reactor to identify where the specimen was detached or not. The test was carried out up to 60 minutes.

TABLE 1

| | Adhesion force and adhesion force distribution | | | |
|---|---|---|---|---|
| | Average adhesion force (gf/25 mm) | Cp | Cpk | Adhesion force retention time (min) |
| Example 1 | 1651.8 | 2.52 | 1.75 | 60 minutes or more |
| Comparative Example 1 | 1550.2 | 1.05 | 0.94 | 15-20 minutes |

Accordingly to Table 1, the washer of Example 1 manufactured using an organic solution and a fat-soluble indication shows better adhesion force and adhesion force distribution (the adhesion force of each portion of the washer is similar) than the washer of Comparative Example 1 manufactured using water, which is an aqueous solution, and a water-soluble indicator. Also, it can be seen that the adhesion force retention time of Example 1 was much longer than that of Comparative Example 1.

Experimental Example 3: Evaluation of Appearance Defect Rate of Secondary Battery (Degree of Contamination)

A secondary battery was manufactured using the washer of each of Example 1 and Comparative Example 1 and activated (partial charge and discharge), and in the course of two weeks during which the secondary battery was left unattended, the appearance defect rate of the secondary battery was evaluated.

Specifically, a secondary battery was manufactured in the following manner. Using Ni-plated SPCE (cold-rolled steel plate) to produce a top cap and a cylindrical can were manufactured. An electrode assembly was mounted in the cylindrical can, and then an electrolyte was injected. The washer prepared in Example 1 and Comparative Example 1 was respectively mounted and adhered on the top of a crimping portion while wrapping a top cap of a cap assembly to manufacture a cylindrical secondary battery. Thereafter, the secondary batter was left unattended for two weeks.

Figure 5:
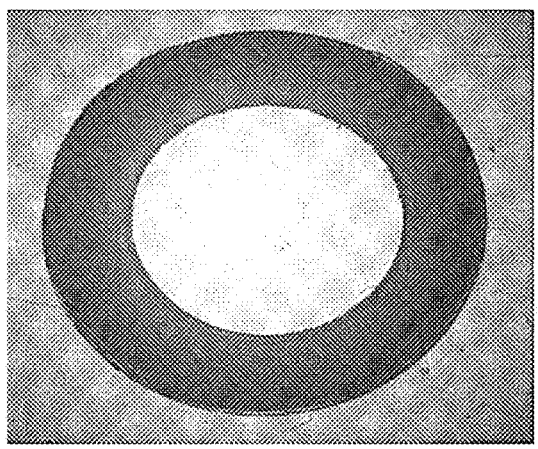
FIG. 5 are photographs of washers of examples and comparative examples.
Figure 5:
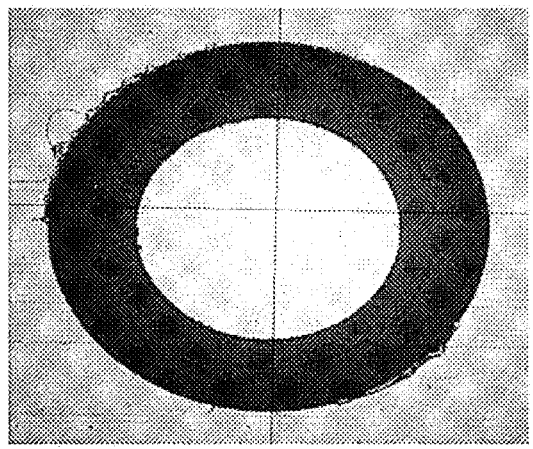

The appearance defect rate was calculated by checking for 200,000 samples, and was calculated as a ratio of the number of samples having an appearance defect to the total number of samples. Here, it was determined to be a defect in appearance if the adhesive component is present while not maintaining the shape of the washer, or not maintaining the shape before the washer was mounted. For example, referring to FIG. 5, (a) corresponds to a non-defective washer, (b) corresponds to a defective washer since there are portions around the washer in which the adhesive component is detached.

TABLE 2

| | Appearance defect rate immediately after washer was mounted (5) | Appearance defect rate after activation (%) | Appearance defect rate after leaving unattended for two weeks |
|---|---|---|---|
| Example 1 | 0.6 | 7 | 0.04 |
| Comparative Example 1 | 25 | 34 | 4.6 |

According to Table 2, when the washer of Example 1 was used, the appearance defect rate immediately after the washer was mounted, after the activation, and after leaving unattended for two weeks was substantially lower than when the washer of Comparative Example 1 was used.

Experimental Example 4: Observation of Color Change of Washer of Example 1

Figure 6:
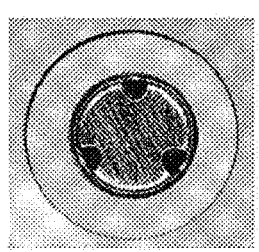
FIG. 6 is a photograph showing the change in color of the washer of Example 1.
Figure 6:
Figure 6:
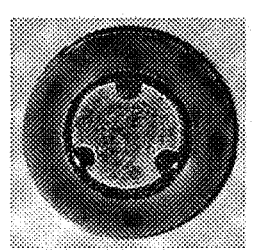
Figure 6:
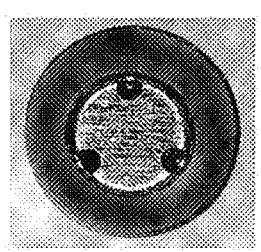
Figure 6:
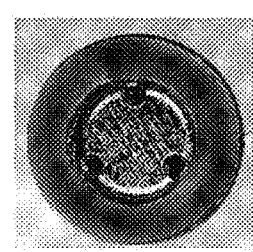

Using Ni-plated SPCE (cold-rolled steel plate) to produce a top cap and a cylindrical can were manufactured. An electrode assembly was mounted in the cylindrical can, and then an electrolyte was injected. The washer of Example 1 was mounted and adhered on the top of a crimping portion while wrapping a top cap of a cap assembly to manufacture a cylindrical secondary battery. A pressure of 30 kgf was applied to the inside the battery to generate the leakage of the electrolyte, and the color change of the washer was identified. Referring to FIG. 6, the battery using the washer of Example 1 shows the color change of the washer through the film layer (the leftmost washer is the washer of a battery before the leakage of the electrolyte), and the color of the washer is light gray in the black and white drawing and the actual photograph. Next, the right side shows a change in the color of the washer due to the leakage of the electrolyte, and while the color of the washer is dark gray in the black, the actual color is red and purple. Therefore, the leakage of the electrolyte can be easily identified with the naked eye.

The invention claimed is:

1. A secondary battery comprising:
   an electrode assembly including a positive electrode, a separator, and a negative electrode;
   a can having the electrode assembly embedded therein and including a crimping portion on the top thereof; and
   a washer mounted on the crimping portion,
   wherein the washer includes:
      a film layer, and
      an adhesive layer on at least one surface of the film layer,
      wherein the adhesive layer includes an adhesive component and a fat-soluble indicator component, and wherein the indicator component includes at least any one of p-dimethylaminoazobenzene, tropeolin OO, and pentamethoxy red.

2. The secondary battery of claim 1, wherein the washer is fixed on the crimping portion in an adhesive manner or a mechanical coupling manner.

3. The secondary battery of claim 1, wherein the adhesive layer includes the indicator component in an amount of 0.02 wt % to 30 wt % based on the total weight of the adhesive layer.

4. The secondary battery of claim 1, wherein the adhesive component comprises at least any one selected from the group consisting of an acryl-based adhesive compound, a rubber-based adhesive compound, a silicone-based adhesive compound, and a vinyl ether-based adhesive compound.

5. The secondary battery of claim 4, wherein the acryl-based adhesive compound comprises at least any one of
a) a (meth) acrylate-based resin;
b) a homopolymer or a copolymer comprising an acrylic acid ester-based monomer derived unit; and
c) a copolymer comprising at least one selected from the acrylic acid ester-based monomer derived unit, an acrylic acid monomer derived unit, an acrylic acid 2-hydroxy ethyl monomer derived unit, and a vinyl acetate monomer derived unit.

6. The secondary battery of claim 1, wherein the film layer includes a material layer configured to transmit a change in color of the adhesive layer to an outside with the film layer interposed therebetween.

7. The secondary battery of claim 1, wherein the film layer includes a transparent material layer or a translucent material layer.

8. The secondary battery of claim 1, wherein the film layer comprises a polymer resin, and the polymer resin includes at least any one selected from the group consisting of a polyolefin-based polymer resin, an acryl-based polymer resin, a polycarbonate-based polymer resin, a vinyl-based polymer resin, an ABS resin, a polystyrene-based polymer resin, a polycarbonate-based polymer resin, tetrafluoroethylene, teflon, polybutylterephthalate, and polyethylene terephthalate.

* * * * *